(12) United States Patent
Permut et al.

(10) Patent No.: US 7,685,613 B2
(45) Date of Patent: Mar. 23, 2010

(54) COMBINATION STORAGE EXTRACTING AND BIASING SYSTEM

(76) Inventors: Ronald Marc Permut, 817 W. Willow St., Louisville, CO (US) 80027; Edwin Jack Wadsworth, 1262 Milner Lain, Longmont, CO (US) 80503

( * ) Notice: Subject to any disclaimer, the term of this patent is extended or adjusted under 35 U.S.C. 154(b) by 1083 days.

(21) Appl. No.: 11/037,985

(22) Filed: Jan. 18, 2005

(65) Prior Publication Data

US 2006/0161936 A1 Jul. 20, 2006

(51) Int. Cl.
G11B 33/02 (2006.01)
G06F 1/16 (2006.01)

(52) U.S. Cl. .................... 720/657; 361/679.38

(58) Field of Classification Search ............. 720/654, 720/657; 360/99.08, 99.09; 361/683–686, 361/727, 679.33, 679.37, 679.38, 724, 726
See application file for complete search history.

(56) References Cited

U.S. PATENT DOCUMENTS

| 4,225,893 | A | * | 9/1980 | Loiselle | 360/128 |
|---|---|---|---|---|---|
| 4,230,351 | A | * | 10/1980 | Bisbing | 292/223 |
| 4,256,251 | A | * | 3/1981 | Moshofsky | 227/120 |
| 4,307,969 | A | * | 12/1981 | Daughters | 400/208 |
| 4,566,206 | A | * | 1/1986 | Weber | 36/7.8 |
| 4,941,841 | A | * | 7/1990 | Darden et al. | 361/685 |
| 4,982,303 | A | * | 1/1991 | Krenz | 360/137 |
| 5,010,426 | A | * | 4/1991 | Krenz | 360/97.01 |
| 5,045,960 | A | * | 9/1991 | Eding | 360/97.01 |
| 5,077,722 | A | * | 12/1991 | Geist et al. | 720/657 |
| 5,222,897 | A | * | 6/1993 | Collins et al. | 439/157 |
| 5,379,184 | A | * | 1/1995 | Barraza et al. | 361/685 |
| 5,475,783 | A | * | 12/1995 | Kurashima | 385/92 |
| 5,549,375 | A | * | 8/1996 | Pagliaccio | 312/319.1 |
| 5,587,854 | A | * | 12/1996 | Sato et al. | 360/97.01 |
| 5,633,971 | A | * | 5/1997 | Kurashima | 385/78 |
| 5,668,696 | A | * | 9/1997 | Schmitt | 361/685 |
| 5,721,669 | A | * | 2/1998 | Becker et al. | 361/685 |

(Continued)

FOREIGN PATENT DOCUMENTS

WO WO2005/010661 A2 2/2005

(Continued)

OTHER PUBLICATIONS

U.S. Appl. No. 10/950,613, Starr et al.

(Continued)

*Primary Examiner*—Brian E Miller
(74) *Attorney, Agent, or Firm*—Kenneth Altshuler

(57) ABSTRACT

Disclosed is a method and apparatus for a combination storage extracting and biasing system. The method and apparatus comprise an enclosure having a first surface and a second surface inside the enclosure. The method and apparatus also comprise at least one random access memory device adapted to be disposed substantially in the enclosure having a third surface and a fourth surface. The device comprises at least one device contact located at the third surface and adapted to be electrically linked with at least one corresponding enclosure contact located at the first surface. The at least one spring member attached to the device and interposed between the second surface and the fourth surface wherein the spring member is adapted for use as a handle to remove the device from the enclosure and to provide pressure on the contacts.

19 Claims, 13 Drawing Sheets

U.S. PATENT DOCUMENTS

| | | | | |
|---|---|---|---|---|
| 5,734,549 | A * | 3/1998 | Oura | 361/685 |
| 5,765,933 | A * | 6/1998 | Paul et al. | 312/332.1 |
| 5,777,845 | A * | 7/1998 | Krum et al. | 361/685 |
| 5,793,614 | A * | 8/1998 | Tollbom | 361/732 |
| 5,823,815 | A * | 10/1998 | Takata | 439/374 |
| 5,825,616 | A * | 10/1998 | Howell et al. | 361/679.38 |
| 5,828,546 | A * | 10/1998 | Tirrell et al. | 361/685 |
| 5,958,212 | A | 9/1999 | Yamamura et al. | 205/723 |
| 6,052,278 | A * | 4/2000 | Tanzer et al. | 361/685 |
| 6,088,222 | A * | 7/2000 | Schmitt et al. | 361/686 |
| 6,166,900 | A | 12/2000 | Flynn et al. | |
| 6,166,901 | A * | 12/2000 | Gamble et al. | 361/685 |
| 6,169,718 | B1 * | 1/2001 | Matusi | 720/657 |
| 6,272,005 | B1 * | 8/2001 | Jensen et al. | 361/680 |
| 6,283,438 | B1 * | 9/2001 | Shimada et al. | 248/694 |
| 6,351,374 | B1 * | 2/2002 | Sherry | 361/685 |
| 6,356,441 | B1 * | 3/2002 | Claprood | 361/685 |
| 6,359,836 | B1 * | 3/2002 | Sevier et al. | 361/725 |
| 6,445,587 | B1 | 9/2002 | Pavol | |
| 6,471,151 | B1 * | 10/2002 | Kita et al. | 242/345.2 |
| 6,535,390 | B1 * | 3/2003 | Lo | 361/726 |
| 6,556,432 | B2 * | 4/2003 | Chen et al. | 361/685 |
| 6,560,098 | B1 | 5/2003 | Beinor, Jr. et al. | |
| 6,590,848 | B1 * | 7/2003 | Chen | 720/654 |
| 6,600,703 | B1 | 7/2003 | Emberty et al. | |
| 6,633,481 | B2 | 10/2003 | Pavol | |
| 6,643,139 | B2 * | 11/2003 | Tien | 361/727 |
| 6,667,853 | B2 * | 12/2003 | Funakoshi et al. | 360/137 |
| 6,854,174 | B2 * | 2/2005 | Jiang | 29/603.1 |
| 6,912,132 | B2 * | 6/2005 | Riddiford et al. | 361/727 |
| 6,956,738 | B2 * | 10/2005 | Bruner et al. | 361/685 |
| 6,992,886 | B2 * | 1/2006 | Salinas et al. | 361/679.38 |
| 7,031,150 | B2 * | 4/2006 | Chen et al. | 361/685 |
| 7,035,098 | B2 * | 4/2006 | Huang et al. | 361/685 |
| 7,057,890 | B2 * | 6/2006 | Chang | 361/684 |
| 7,072,177 | B2 * | 7/2006 | Peng et al. | 361/685 |
| 7,177,145 | B2 * | 2/2007 | Carlson et al. | 361/685 |
| 2002/0144044 | A1 | 10/2002 | Moon et al. | |
| 2004/0105187 | A1 | 6/2004 | Woodruff et al. | |
| 2004/0223253 | A1 | 11/2004 | Woodruff et al. | |
| 2004/0264037 | A1 | 12/2004 | Downey et al. | |
| 2004/0264038 | A1 | 12/2004 | Heineman et al. | |
| 2004/0264039 | A1 | 12/2004 | Armagost et al. | |
| 2004/0264040 | A1 | 12/2004 | Armagost et al. | |
| 2004/0264041 | A1 | 12/2004 | Kumpon et al. | |
| 2004/0264042 | A1 | 12/2004 | Pollard et al. | |
| 2005/0007692 | A1 | 1/2005 | Thompson et al. | |
| 2005/0047258 | A1 | 3/2005 | Starr et al. | |
| 2005/0063089 | A1 | 3/2005 | Starr et al. | |
| 2005/0065637 | A1 | 3/2005 | Lantry et al. | |
| 2005/0100329 | A1 * | 5/2005 | Lao et al. | 386/117 |
| 2005/0185323 | A1 | 8/2005 | Brace et al. | |
| 2005/0195517 | A1 | 9/2005 | Brace et al. | |
| 2005/0195518 | A1 | 9/2005 | Starr et al. | |
| 2005/0195519 | A1 | 9/2005 | Kumpon et al. | |
| 2005/0195520 | A1 | 9/2005 | Starr et al. | |
| 2005/0219964 | A1 | 10/2005 | Pollard et al. | |
| 2005/0246484 | A1 | 11/2005 | Lantry et al. | |
| 2005/0267627 | A1 | 12/2005 | Lantry et al. | |
| 2006/0132964 | A1 * | 6/2006 | Lau et al. | 360/92 |
| 2006/0134997 | A1 * | 6/2006 | Curtis et al. | 439/700 |
| 2006/0171108 | A1 * | 8/2006 | Albrecht et al. | 361/685 |
| 2007/0076366 | A1 * | 4/2007 | Makabe | 361/685 |

FOREIGN PATENT DOCUMENTS

| | | |
|---|---|---|
| WO | 2005/045168 | 12/2005 |
| WO | 2005/046447 | 12/2005 |

OTHER PUBLICATIONS

U.S. Appl. No. 10/951,321, Wong.
U.S. Appl. No. 10/980,594, Fenske et al.
U.S. Appl. No. 11/011,812, Starr et al.
U.S. Appl. No. 11/019,911, Curtis et al.
U.S. Appl. No. 11/040,937, Starr et al.
U.S. Appl. No. 11/089,749, Starr et al.
U.S. Appl. No. 11/123,725, Rector et al.
U.S. Appl. No. 11/126,025, Rector et al.
U.S. Appl. No. 11/145,768, Downey et al.
U.S. Appl. No. 11/230,148, Starr et al.
U.S. Appl. No. 11/240,893, Starr et al.
U.S. Appl. No. 11/264,920, Lantry et al.

* cited by examiner

COMBINATION STORAGE EXTRACTING AND BIASING SYSTEM

CROSS-REFERENCE TO RELATED APPLICATIONS

None.

FIELD OF THE INVENTION

The present invention relates generally to a combination extracting and biasing system intended for a random access storage device for use with a storage system.

BACKGROUND

Data storage libraries, and more particularly data storage libraries having mobile media, are typically used to store and retrieve large amounts of data for data manipulation and archiving purposes. Data storage libraries are generally comprised of drive systems adapted to read and write data to and from media often housed within the libraries. Typically, such media is archived at locations within the library or, alternatively, moved out of the library for safe keeping. Data storage libraries have recently been constructed with random access memory devices as media for manipulative and archival mass storage. Random access memory devices can include flash memory, PCMCIA cards, and optical storage systems, for example, but the most prevalent are disc drives and RAID (Redundant Array of Independent Disc) drives in particular. Though currently disc drive RAID systems are the most common use of disc drives for data storage library applications, other innovations including disc drive magazines, which are assembled from multiple disc drives operating together as a cooperative media article, are poised for introduction in the marketplace.

These new uses for multiple disc drives in array systems, such as disc drive magazines, also present new challenges in the context of storage libraries. For example, most disc drives plug into a receiving socket, such as a Parallel ATA strip, that typically resides in the array systems. The quality of the connection between the disc drive and the receiving socket is usually a necessary prerequisite for reliable data transfer between various components of a storage system and the disc drive. In some instances, the quality of the connection can be jeopardized, such as if the disc drives are in a mobile system, for example a disc drive magazine, whereby motion or cyclic use can cause a disc drive to partially or wholly disengage from the connection. Another challenge includes disc drive accessibility for purposes of removing an individual disc drive from a multiple disc drive array. Such accessibility may be desirable if, by way of example, a disc drive fails and needs to be replaced, or if a higher capacity drive becomes available for incorporation into the drive array.

In an effort to provide a robust system to meet some of the challenges of integrating random access memory devices in storage system, such as in an array configuration, the present invention provides a method and apparatus for stabilizing and accessing a random access memory device. It is to this subject matter that the claimed invention is generally directed.

SUMMARY OF THE INVENTION

The present invention relates generally to a combination extracting and biasing system intended for a random access storage device for use with a storage system and provides a method and apparatus capable of stabilizing electrical connections with the storage device within an enclosure adapted to substantially enclose the storage device and capable of removing the storage device from the enclosure.

Embodiment of the present invention can therefore comprise an enclosure having a first surface and a second surface inside the enclosure; at least one random access memory device adapted to be disposed substantially in the enclosure having a third surface and a fourth surface; the device having at least one device contact located at the third surface and adapted to be electrically linked with at least one corresponding enclosure contact located at the first surface; at least one spring member attached to the device and interposed between the second surface and the fourth surface wherein the spring member is adapted for use as a handle to remove the device from the enclosure and to provide pressure on the contacts.

Embodiments of the present invention can further comprise a method for using a combination storage bias and extraction system comprising: inserting a random access memory device in an enclosure adapted to receive the device; linking the device electrically with at least one enclosure contact cooperating with the enclosure through at least one corresponding device contact cooperating with the device; applying pressure between the device contact and the corresponding enclosure contact from force generated by at least one spring member interposed between at least one device surface and at least one enclosure surface; and removing the device from the enclosure by the spring member.

Embodiments of the present invention can further comprise a combination storage extracting and biasing system comprising: an enclosure comprising at least one enclosure contact element; at least one random access memory device disposed substantially in the enclosure, the device comprising at least one device contact element and at least one spring and handle member; the device electrically linked with the at least one enclosure contact element via the at least one device contact element in a corresponding relationship; the at least one spring and handle member adapted to generate pressure on the contact element and the corresponding contact element when the device is disposed substantially in the enclosure; and the at least one spring and handle member capable of being used to remove the device from the enclosure.

Embodiments of the present invention can further comprise a combination storage extracting and biasing system comprising at least one random access memory device comprising at least one device contact element and at least one spring and handle member; the device capable of being electrically engaged with at least one corresponding contact element; the at least one spring and handle member capable of generating pressure between the contact element and the corresponding contact element; and the at least one spring and handle member capable of being used to disengage the device from the corresponding contact element.

Embodiments of the present invention can yet further comprise a magazine for use with a data storage and retrieval system, comprising: a frame defining at least one enclosure; at least one enclosure contact disposed within each of the at least one enclosure; a data storage medium sized to be received substantially within the at least one enclosure and having at least one disc drive contact that is cooperatively engageable with the at least one enclosure contact; and a resilient element attached to the data storage medium and disposed such that, when the resilient element is compressed, the at least one enclosure contact and the at least one disc drive contact are held in cooperative engagement and wherein the resilient element is capable for use as a handle to remove the data storage medium from the enclosure.

DETAILED DESCRIPTION

Figure 1:
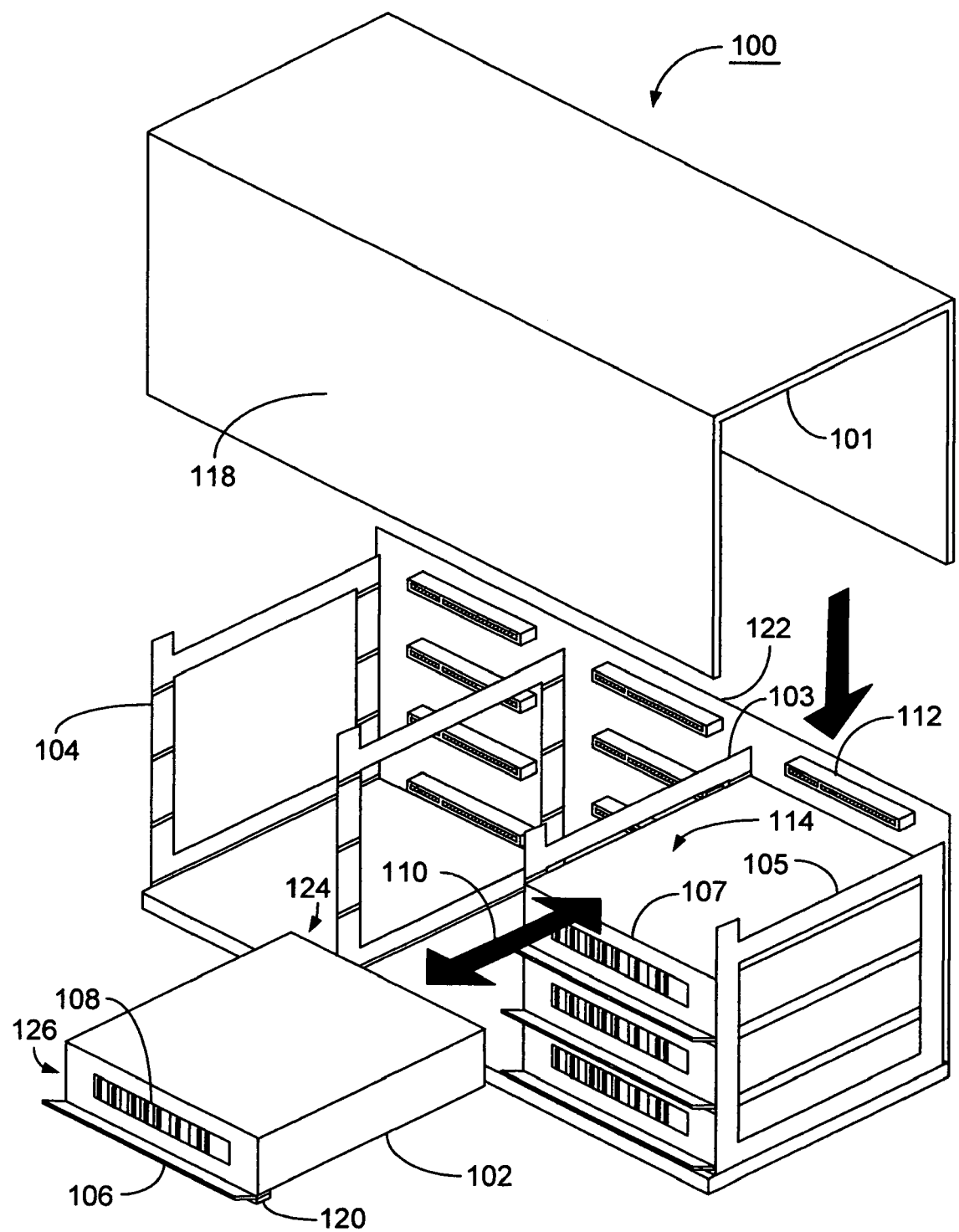
FIG. 1 is an exploded perspective view of a mobile disc drive magazine constructed in accordance with an embodiment of the present invention.

Referring to the drawings in general, and more specifically to FIG. 1, shown therein is an exploded perspective view of a mobile disc drive magazine 100 constructed in accordance with an embodiment of the present invention. In what follows, similar or identical structure is identified using identical callouts.

While the claimed invention has utility in any number of different applications, the mobile disc drive magazine 100 has been provided to illustrate a particularly suitable environment in which embodiments of the claimed invention can be practiced. In this embodiment, a plurality of disc drives 102 is substantially contained by a multi-disc drive support frame 104. As one of ordinary skill will appreciate, each of the disc drives 102 is merely one example of a random access memory device, and other suitable devices, such as flash memory and optical memory, could be used without departing from the scope of the invention. A back surface 122 of the support frame 104 comprises one or more enclosure contacts 112, in this case female strip sockets, adapted to receive cooperating device contacts, in the illustrative case multi-pin male strip plugs (not shown), disposed on an engaging surface 124 of each of the disc drives 102. In one embodiment, the enclosure contacts 112 link the disc drives 102 with the magazine 100 to cooperate as a storage element capable of working with a storage system (not shown), such as the one described in the disclosure of "SPRING BASED CONTINUITY ALIGNMENT APPARATUS AND METHOD", U.S. Ser. No. 10/605,222 filed Sep. 16, 2003 which is hereby incorporated by reference, which could be adapted to operate with a plurality of storage elements, or directly with a host (not shown), for example. Here, each of the disc drives 102 includes an identifying indicia, such as bar code 108, which is disposed on a disc drive face 126 for purposes of identification. Additionally, each of the disc drives 102 comprise a spring and handle member 106 attached to the disc drive 102 by an attaching means, such as an attaching plate 120 and screws (not shown). The use of the term "spring" herein merely denotes resiliency sufficient to achieve the biasing described later, and does not require the use of conventional coil or leaf springs.

Each the disc drives 102 is capable of being inserted 110 in a receiving space 114 adapted to receiving and support the disc drive 102. Here, the receiving space 114 is a space defined by the top of a lower disc drive surface 107 the back surface 122 of the support frame 104, the inner surfaces 101 of the of the enclosure cover 118 and a first 103 and second 105 panel of the support frame 104. Each of the disc drives 102 is also adapted to be removed 110 from the receiving space 114 by pulling on the spring and handle member 106. The support frame 104 is capable of being housed in an enclosure cover 118 comprising the disc drive magazine 100. The enclosure cover 118, in use, is also adapted to compress the spring and handle member 106 providing pressure to ensure adequate contact between the disc drive contacts (not shown) and the enclosure contacts 112 when the disc drive 102 is disposed in the magazine 100. The spring and handle member 106 is further capable of substantially stabilizing the disc drive 102 from freely moving inside the receiving space 114 when the enclosure cover 118 is engaged with the support frame 104.

Figure 2:
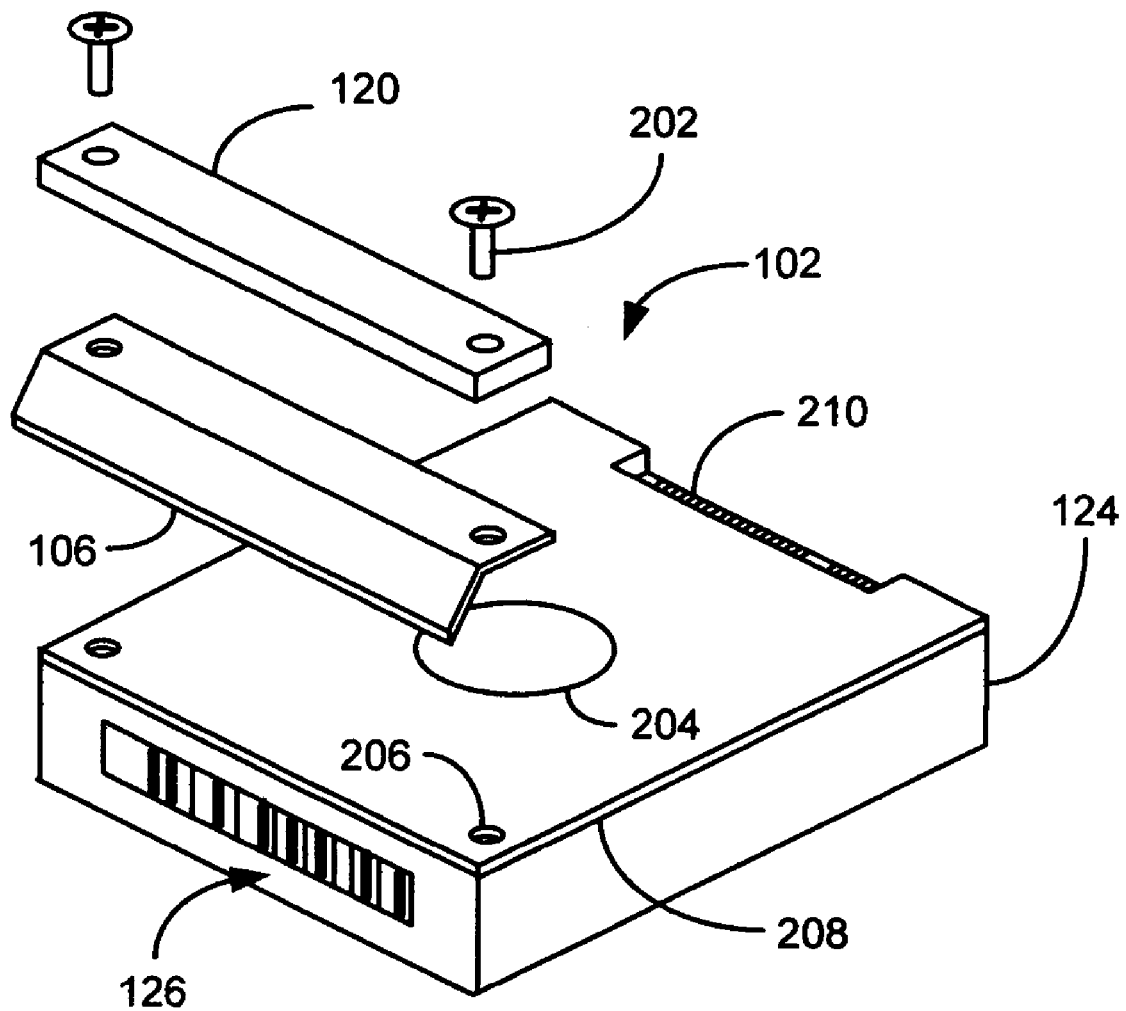
FIG. 2 is an exploded perspective view of a disc drive and spring and handle member assembly consistent with embodiments of the present invention.

FIG. 2 is an exploded perspective view of the disc drive 102 and spring and handle member 106 assembly consistent with embodiments of the present invention. Here, the spring and handle member 106 is illustratively attached to the bottom of the disc drive 102 via attaching holes 206 shown on the PC Board Assembly 208, though other dispositions of the spring and handle member 106 (such as attaching the spring and handle member 106 to a top or side surface of one of the disc drives 102) remains within the scope of the present invention. The spring and handle member 106 is shown constrained by the attaching plate 120 and screws 202, though other attachment means, such as adhesives, bolts, and similar fasteners, could be used instead. As disclosed in FIG. 1, the disc drive 102 is capable of being inserted 110 into a receiving space 114 where the disc drive contact 210 can connect with the enclosure contact 112 when the disc drive engaging surface 124 is engaged with the back surface 122 of the frame 104. Examples of disc drive contacts include SCSI (Small Computer System Interface) connectors, Serial ATA and Parallel ATA connectors, just to name three. The disc drive 102 can be removed by using the spring member 106 as a handle. The placement of the disc drive spindle motor 204 is shown here for reference.

Figure 3A:
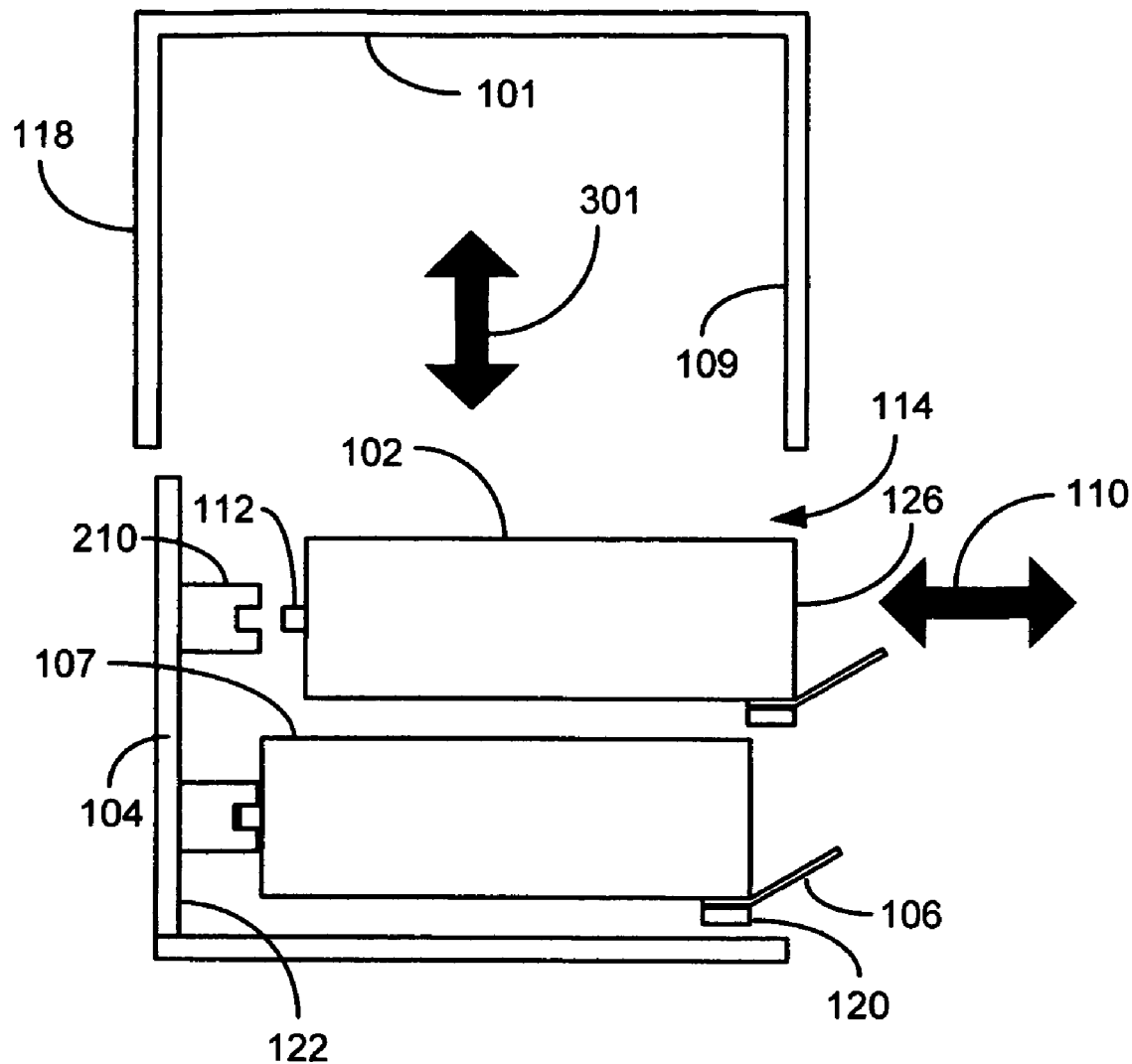
FIG. 3A shows a side view embodiment of a block diagram similar to the arrangement of FIG. 1 of a disc drive being inserted in the receiving space consistent with embodiments of the present invention.
Figure 3B:
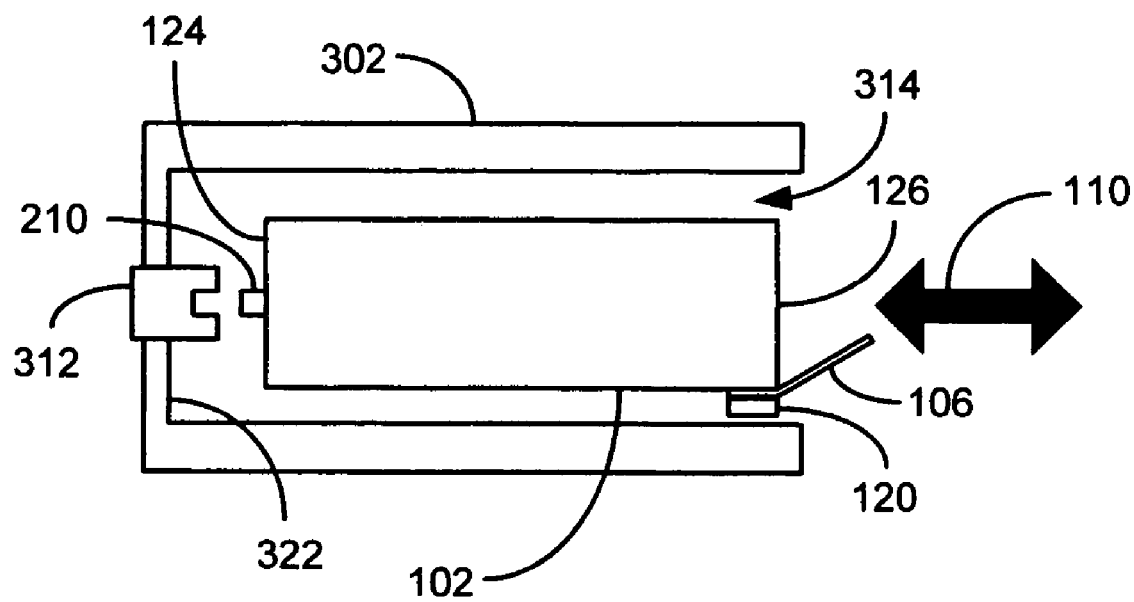
FIG. 3B shows a side view block diagram of a disc drive in a non-engaged relationship with the receiving space of an enclosure consistent with embodiments of the present invention.
Figure 3C:
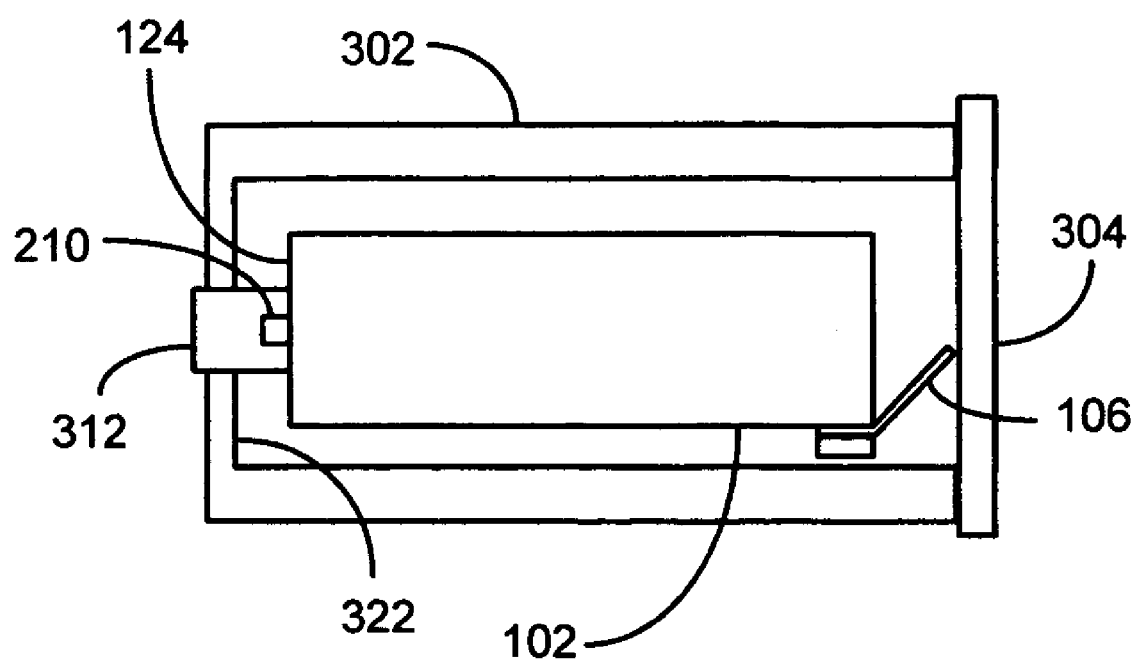
FIG. 3C shows a side view block diagram of the disc drive in contact with the enclosure engaging surface through the disc drive contact and enclosure contact consistent with embodiments of the present invention.

FIG. 3A-3C are block diagrams illustrating an example of a spring and handle member being used in an embodiment of the present invention. FIG. 3A shows a side view block diagram similar to the arrangement of FIG. 1 of a disc drive 102 being inserted in the receiving space 114. In this embodiment, the receiving space 114 is a space substantially defined by the top of the lower disc drive surface 107 the back surface 122 of the support frame 104 and the inner surfaces 101 of the of the enclosure cover 118. Here, the disc drive 102 is positioned for engagement 110 between the disc drive contact 210 and the enclosure contact 112 disposed at the back surface 122 of the enclosure receiving space 114. The enclosure cover 118 provides a surface 101 for the spring and handle member 106 to compress against when the enclosure cover 118 is engaged with the support frame 104.

FIGS. 3B and 3C show an alternative embodiment of a storage biasing and extracting system according to the present invention, and more particularly a side view block diagram of the disc drive 102. Here, the disc drive 102 is in a non engaged position wherein the receiving space 314 is substantially defined by the inner surfaces of an enclosure receiving space 302. In this embodiment, the disc drive contact 210 disposed at the disc drive engaging surface 124 is not engaged with the enclosure contact 312 disposed at the back surface 322 of the enclosure receiving space 302. Here, the spring and handle member 106 is in an unconstrained position. The spring and handle member 106 is attached by the attaching plate 120 configured, in the illustrative embodiment, to protrude from the disc drive face 126. The disc drive 102 is adapted to be inserted 110 in or removed 110 from a receiving space 314 in the enclosure receiving space 302. The enclosure receiving space 314 could either comprise a compartment defined by partitions or a space defined by adjacent surfaces of disc drives 102. FIG. 3C shows a side view block diagram of the disc drive 102, illustrating the situation where the disc drive 102 is in contact with the enclosure engaging surface 322 through the disc drive contact 210 and enclosure contact 312. Here, the disc drive 102 is electrically linked with the enclosure contact 312. The spring and handle member 106 is interposed in a compressed position between a door 304 and the disc drive 102 providing pressure on the contacts 210 and 312 that electrically link the disc drive 102 with the enclosure contact 312. The compression may be achieved either simply by the weight of the door 304, or by spring-loading or otherwise biasing the door 304 toward the enclosure engaging surface 322. The door 304 and the enclosure receiving space 302 substantially comprise the enclosure.

Figure 4A:
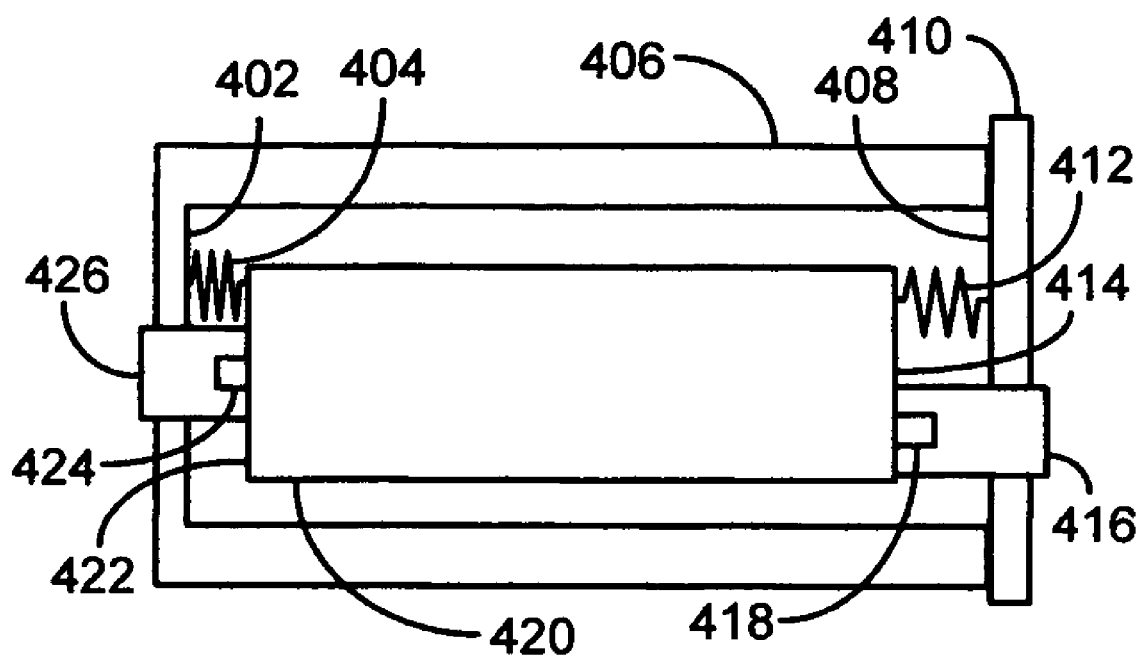
FIG. 4A shows an embodiment of the present invention of a side view block diagram of a random access memory device disposed in an enclosure comprised of a enclosure receiving space and a door.

FIG. 4A-4E are block diagrams showing alternative embodiments of the present invention. FIG. 4A shows an embodiment of a side view block diagram of a random access memory device 420 disposed in an enclosure comprised of an enclosure receiving space 406 and a door 410. Here, the enclosure 406 and 410 has a first surface 402, herein referred to as surface A, located in the enclosure receiving space 406 and a second surface 408, herein referred to as surface B, located at the enclosure door 410. The random access memory device 420 has a third surface 422, herein referred to as surface C, with a first device contact 424 and a fourth surface 414, herein referred to as surface D, with a second device contact 418. Surface A 402 comprises a first enclosure contact 426 adapted to engage the first device contact 424 in a cooperating relationship, and surface B comprises a second enclosure contact 416 adapted to cooperate in a corresponding relationship with the second device contact 418. The device contacts 424 and 418 are on opposite surfaces of the device 420 and the enclosure contacts 426 and 416 are on opposite surfaces of the enclosure 406 and 410. In this embodiment, a handle and spring member 412 is interposed between surface B 408 and surface D 414. In addition, a second spring member 404 is interposed between surface A 402 and surface C 422. The second spring member 404 is capable of ejecting the device 420 from the enclosure receiving space 406 when the door 410 is disengaged from the device 420 or the enclosure receiving space 406 (i.e. the door 410 is opened). The handle and spring member 412 and the second spring member 404 are arranged to be interposed in an opposite surface arrangement as shown here. In this embodiment, opposite surfaces are considered surface A 402 and surface B 408 or surface C 422 and surface D 414. The contacts 426 and 424, 416 and 418 are electrically linked with improved contact provided by pressure created from at least one of the compressed spring members 412 and 404 when the device 420 is disposed in the enclosure 406 and 410. A spring and handle member 412 could be made from a variety of different materials including metal (such as steel), polymer (such as foam, nylon, mylar, etc.), natural materials (such as wood, reed, etc.) and composites of any of the aforementioned, just to provide some examples.

Figure 4B:
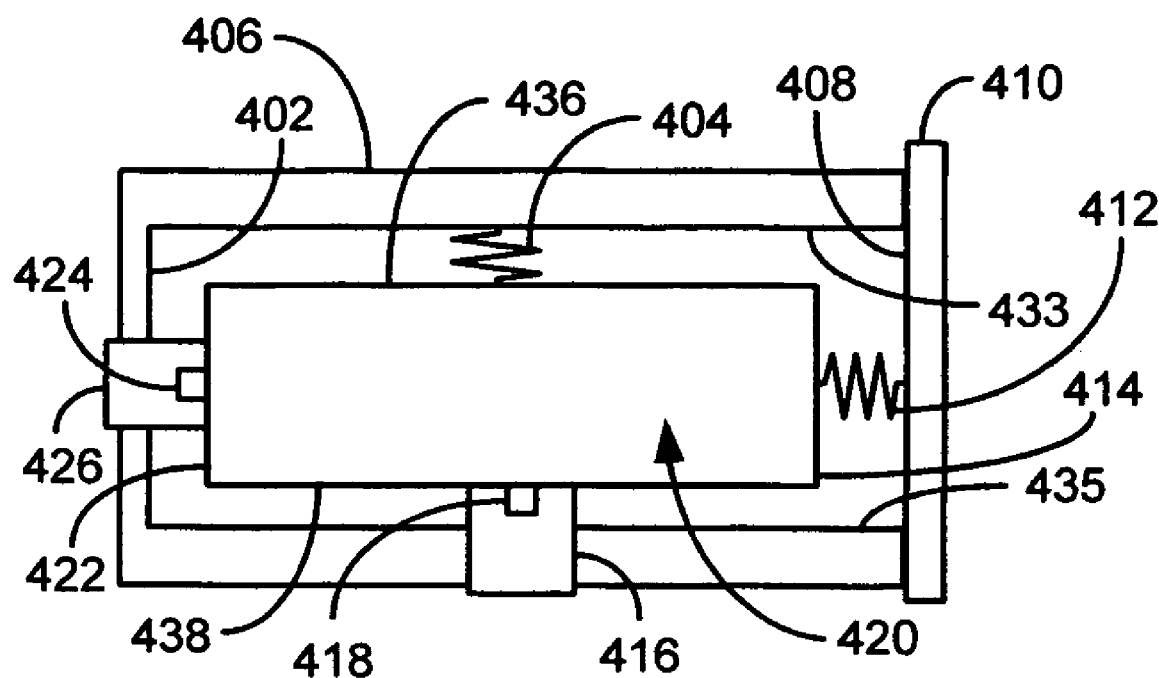
FIG. 4B shows an alternative embodiment of the present invention of a side view block diagram of a random access memory device disposed in an enclosure comprised of a enclosure receiving space and a door.

FIG. 4B shows an alternative embodiment of a side view block diagram of a random access memory device 420 disposed in an enclosure comprised of an enclosure receiving space 406 and a door 410. Here, the enclosure receiving space 406 comprises surface A 402 with the first enclosure contact 426 and a seventh surface 435, herein referred to as surface G, with the second enclosure contact 416. The device 420 has surface C 422 comprising the first device contact 424 adapted to correspond in a cooperating relationship with the first enclosure contact 426 and an eighth surface 438, herein referred to as surface H, of the device 420 with the second device contact 418 adapted to correspond in a cooperating relationship with the second enclosure contact 416. In this embodiment, the handle and spring member 412 is interposed between surface B 408 located at the enclosure door 410 and surface D 414 of the device 420. In addition, the second spring member 404 is interposed between a sixth surface 436, herein referred to as surface F, of the device 420 and a fifth surface 433, herein referred to as surface E, of the enclosure receiving space 406. The spring members 404 and 412 and the contacts 418 and 416, 424 and 426, respectively, are constructed in an opposite arrangement in this embodiment. The contacts 426 and 424, 416 and 418 are electrically linked with improved contact provided by pressure created from the compressed spring members 412 and 404 when the device 420 is disposed in the enclosure 406 and 410.

Figure 4C:
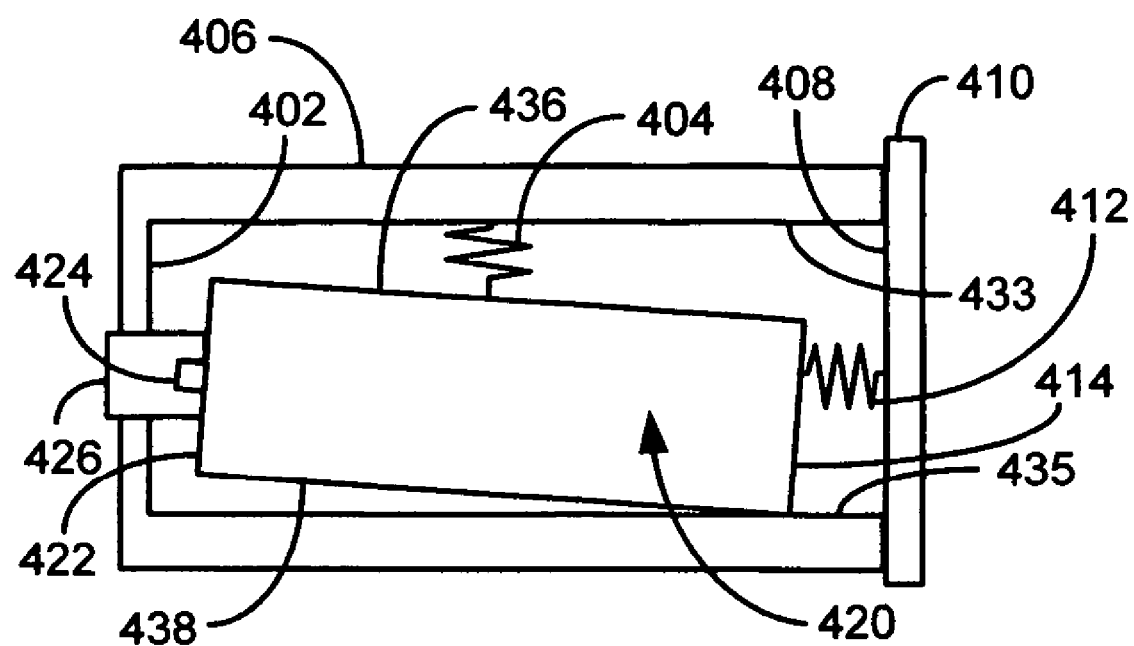
FIG. 4C shows yet another embodiment of the present invention of a side view block diagram of a random access memory device disposed in an enclosure comprised of a enclosure receiving space and a door.

FIG. 4C shows yet another embodiment of a side view block diagram of a random access memory device 420 disposed in an enclosure comprised of an enclosure receiving space 406 and a door 410. Here, the enclosure receiving space 406 comprises surface A 402 with the enclosure contact 426, wherein the device 420 has surface C 422 comprising the first device contact 424 adapted to correspond in a cooperating relationship with the enclosure contact 426. In this embodiment, a handle and spring member 412 is interposed between surface B 408 and surface D 414 on opposite surfaces relative to the respective contacts 426 and 424. In addition, a second spring member 404 is interposed between surface F 436 of the device 420 and surface E 433 of the enclosure receiving space 406. Surface H 438 of the device 420 is in contact with surface G 435 of the enclosure receiving space 406 helping to constrain the device 420 within the enclosure 406 and 410 due to the force created by the second spring member 404. The contacts 426 and 424 are electrically linked with improved contact provided by pressure created from at least the compressed handle and spring member 412 when the device 420 is disposed in the enclosure 406 and 410.

Figure 4D:
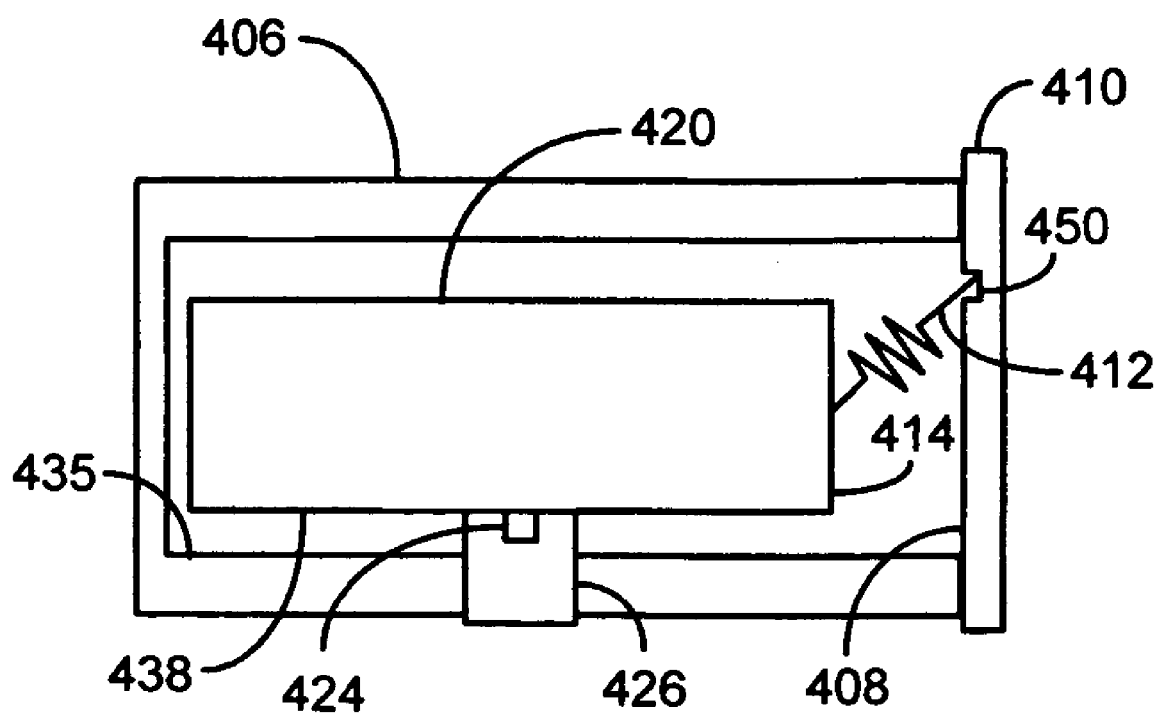
FIG. 4D shows an alternative embodiment of the present invention of a side view block diagram of a random access memory device disposed in an enclosure comprised of a enclosure receiving space and a door.

FIG. 4D shows an alternative embodiment of a side view block diagram of a random access memory device 420 disposed in an enclosure comprised of an enclosure receiving space 406 and a door 410. Here, surface G 435 of the enclosure receiving space 406 comprises the enclosure contact 426. Surface H 438 of the device 420 comprises the device contact 424 adapted to correspond in a cooperating relationship with the enclosure contact 426. The handle and spring member 412 is interposed between surface D 414 and a notch 450 in surface B 408. The contacts 426 and 424 are electrically linked with improved contact provided by pressure created from the compressed handle and spring member 412 when the device 420 is disposed in the enclosure 406 and 410.

Figure 4E:
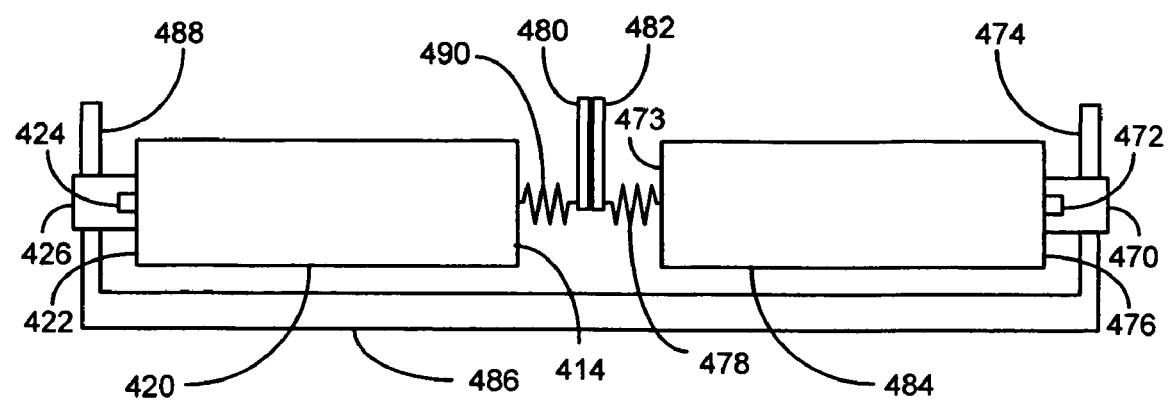
FIG. 4E shows an alternative embodiment of the present invention of a side view block diagram of two random access memory devices substantially disposed in an enclosure.

FIG. 4E shows an alternative embodiment of a side view block diagram of two random access memory devices 420 and 484 substantially disposed in an enclosure 486. Here, the first device 420 comprises a first device contact 424 located at surface C 422 and the second device 484 comprises a second device contact 472 located at a surface J 476. The enclosure 486 has a surface K 488 and a surface L 474 with first 426 and second 470 enclosure contacts respectively. Here, the first device contact 424 is adapted to correspond in a cooperating relationship with the first enclosure contact 426 and the second device contact 472 is adapted to correspond in a cooperating relationship with the second enclosure contact 470. A first spring member 490 and handle 480 is in contact with a second spring member 478 and handle 482 in a compressed state interposed between surface D 414 of the first device 420 and surface M 473 of the second device 484. The contacts 426 and 424, 470 and 472 are electrically linked with improved contact provided by pressure created from the compressed spring members 490 and 478 when the first and second devices 420 and 484 are disposed in the enclosure 486. In this example the compressing surface for the spring 490 is not a door, such as in the door 410, but rather another spring member 478. In an alternative embodiment, the first spring member 490 could use a device surface such as the surface M 473 as a surface in the used for compression of the spring member 490.

It should be appreciated to those skilled in the art that FIG. 4A-4E are illustrative of several examples of the many possible embodiments consistent with the present invention. Some embodiments of the present invention contemplate the use of either devices, such as device 484, or partitions of a frame such as support frame 104 or a combination thereof as defining enclosure spaces for a device, such as device 484. For example, there could be more than two spring members, such as 404, with at least one spring and handle member, such as 490, with many surfaces accommodating the members without departing from the spirit and scope of the present invention.

Figure 5:
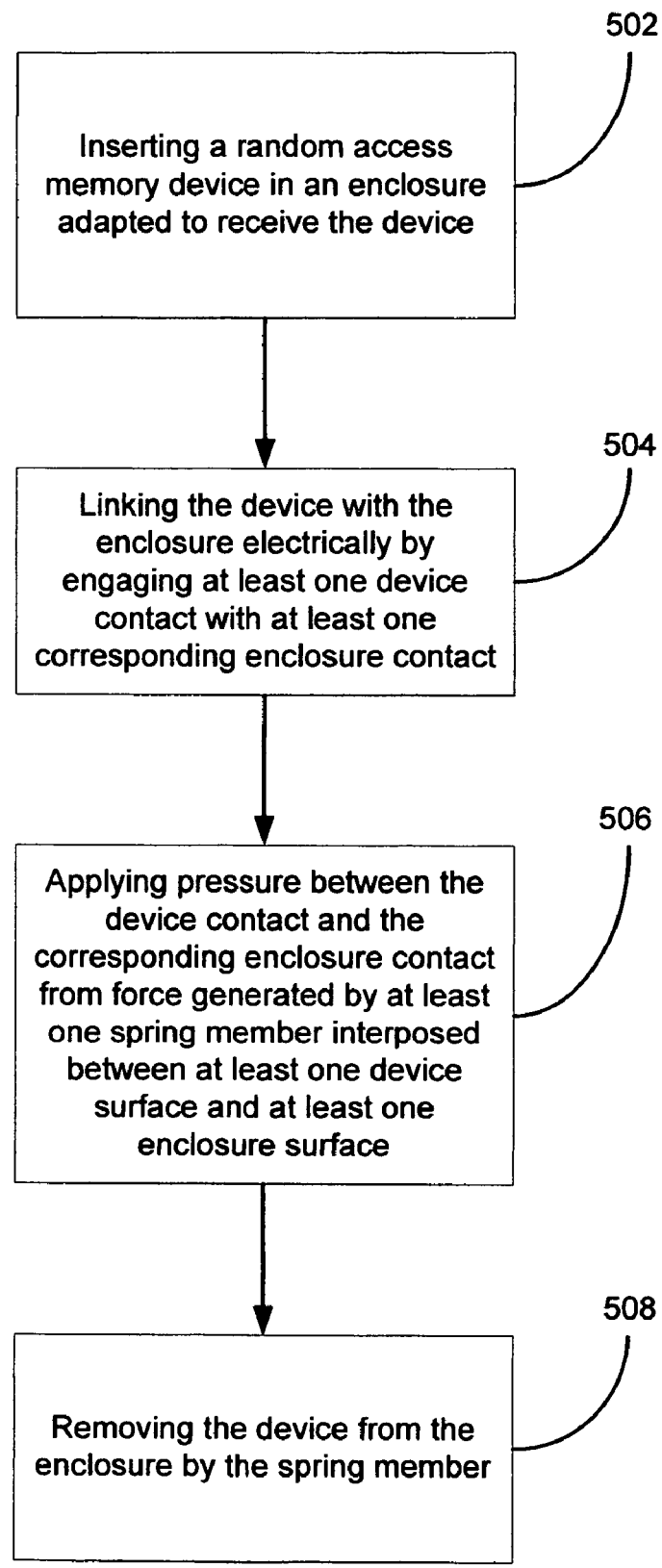
FIG. 5 is a method to practice using a combination storage bias and extraction system in an embodiment of the present invention.

Referring now to FIG. 5, shown therein is a method to practice using a combination storage bias and extraction system in an embodiment of the present invention. It should be recognized that the steps presented in the described embodiments of the present invention do not require any particular sequence. In step 502, a random access memory device 420 is inserted in an enclosure, such as a enclosure receiving space 406, adapted to receive the device 420. In step 504 the device 420 is electrically linked with at least one enclosure contact, such as enclosure contact 426, cooperating with the enclosure, such as the receiving space of the enclosure 406, through at least one corresponding device contact, such as device contact 424, cooperating with the device 420. In step 506, pressure is applied between the device contact 424 and the corresponding enclosure contact 426 from force generated by at least one spring member, such as the handle and spring member 412, interposed between at least one device surface, such as device surface 414, and at least one enclosure surface, such as the door surface 408 or another device, such as device 484 for example. In step 508, the device 420 is removed from the enclosure, such as the receiving space of the enclosure 406, by the spring member 412. The removing step 508 could be accomplished by opening the enclosure door 410 whereby the pressure on the contacts 424 and 426 provided by the spring member 412 is removed and the device 420 pulled out by the handle and spring member 412.

Figure 6:
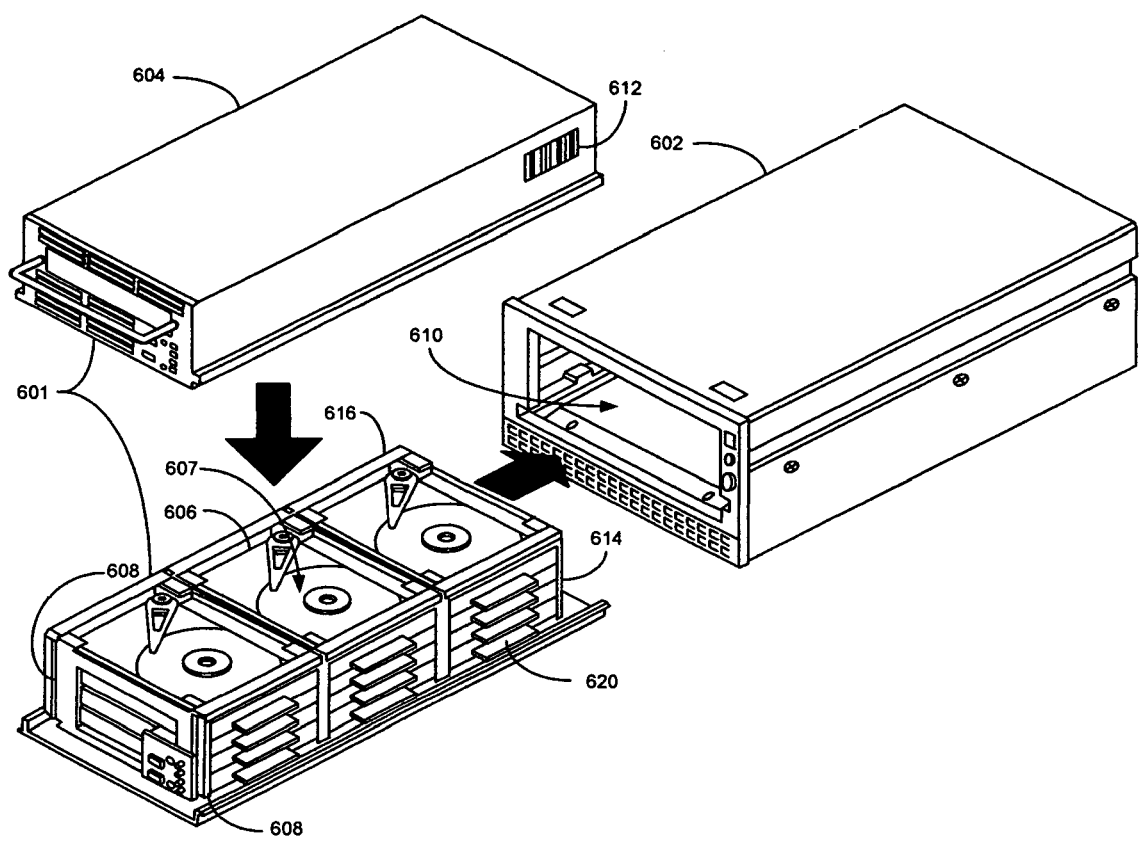
FIG. 6 is an embodiment wherein the present invention could be commercially practiced.

As shown in FIG. 6, embodiments of the present invention could be commercially practiced with an RXT disc drive magazine 601 for use with RXT docking station 602 from Spectra Logic Corporation of Boulder, Colo. Here, a plurality of disc drives 607 is supported by a multi-disc drive support frame 608. The disc drives 607 can be provided by Seagate Corporation of Scotts Valley, Calif., for example. The back surface 616 of the support frame 608 comprises Serial ATA enclosure contacts (not shown), adapted to receive cooperating Serial ATA device contacts (not shown) disposed on the engaging surface 606 of each disc drive 607. The enclosure contacts (not shown) electrically link the disc drives 607 with the magazine 601 to cooperate as a storage element capable of working with the RXT docking station 602. Each disc drive 607 comprises a spring and handle member 620 attached to the disc drive 607 by an attaching plate (not shown) and screws (not shown). The disc drive 607 is capable of being inserted in the support frame 608 by pushing in the disc drive 607 and removed from the support frame 608 by pulling the disc drive 607 out by the spring and handle member 620. The support frame 608 is housed by the magazine cover 604 comprising the disc drive magazine 601. The magazine cover 604 is also adapted to compress the spring and handle member 620 providing pressure to ensure adequate contact between the disc drive contacts (not shown) and the enclosure contacts (not shown). The spring and handle member 106 is further capable of substantially stabilizing the disc drives 607 from freely moving inside the support frame 608 when the magazine cover 604 is engaged to form the magazine 601. The mobile disc drive magazine 601 is adapted to be received by an opening 610 in the docking station 602. The engaging surface 614 of the disc drive magazine 601 is adapted with electrical contacts (not shown) to contact with complimentary electrical contacts (not shown) on the engaging surface (not shown) of the docking station 602. When contact is made, the transmission of data can occur between the docking station 602 and the mobile disc drive magazine 601. Furthermore, power can be provided to the mobile disc drive magazine 601 by the docking station 602. Power and data transmission provide a cooperatively linked state between the disc drive magazine 601 and the docking station 602. The magazine cover 604 shows an example of a magazine identifier label, in this case a bar code 612, used for identifying the mobile disc drive magazine 601, such as when archived in a remote storage location for example. In one embodiment, the disc drive magazine 601 could be configured to operate as a RAID device.

Figure 7:
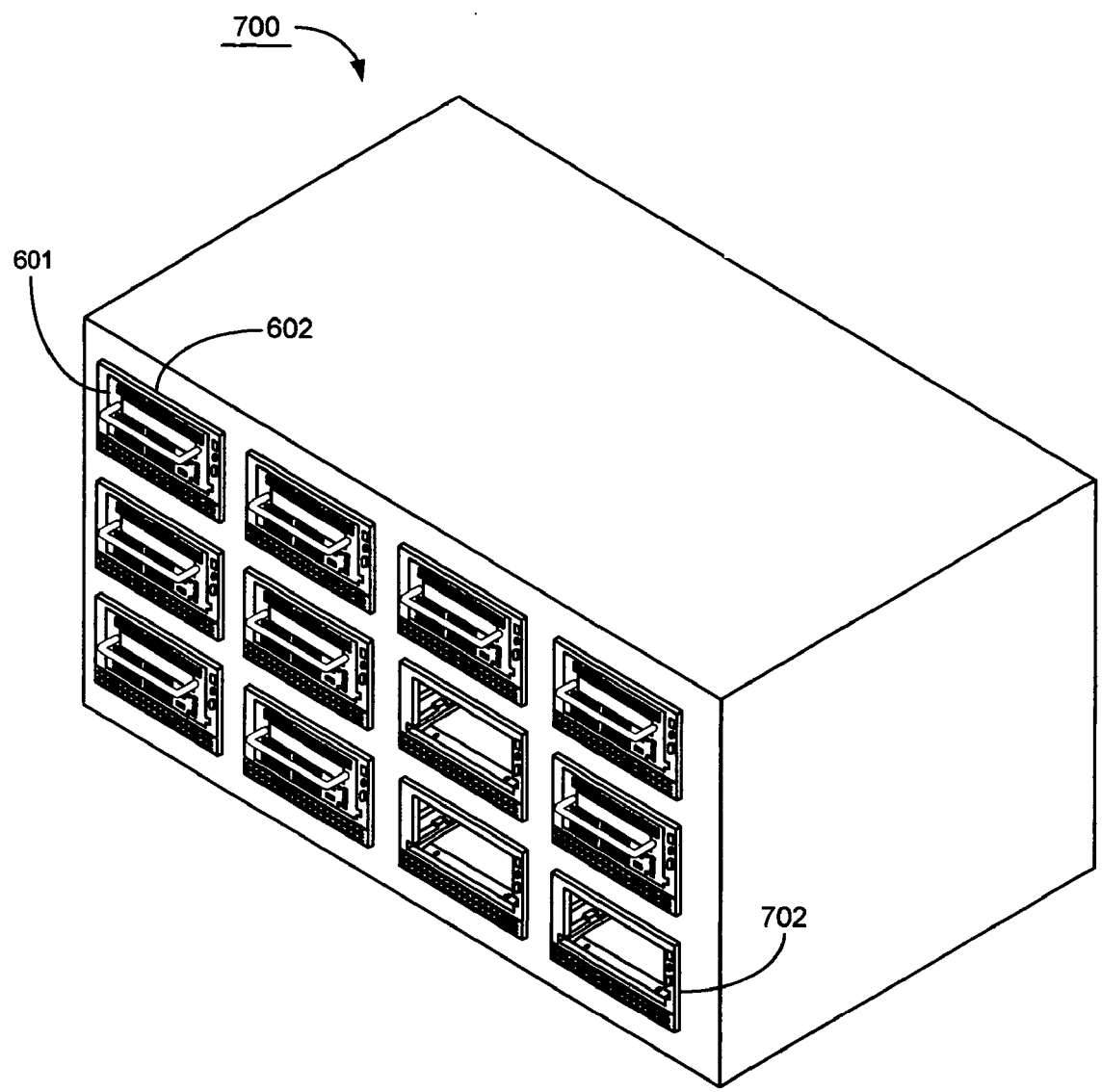
FIG. 7 is a perspective drawing of an embodiment of a storage library wherein the embodiment described in FIG. 6 can be practiced.

FIG. 7 is a perspective drawing of an RXT storage library 700 where a plurality of disc drive magazines 601 is used. Here, the RXT storage library 700 can link twelve docking stations 602 together as a system to support large amounts of data storage for a host system (not shown). The disc drive magazines 601 can be easily removed for archiving in a remote location or dismantling to retrieve the individual disc drives 607. The RXT storage library 700 shows an empty docking station 702 ready to receive a disc drive magazine 601.

It is to be understood that even though numerous characteristics and advantages of various embodiments of the present invention have been set fourth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the spring and handle member, such as 412, could be a solid piece of spring plastic or could be a complex spring and housing system with a handle attached, for example, while still maintain substantially the same functionality without departing from the scope and spirit of the present invention. Further, the surfaces described inside an enclosure, such as an enclosure comprised of a enclosure receiving space 406 and a door 410, could be an enclosure comprising surfaces from other devices, such as device 420, or entirely from a frame, such as the support frame 104, or a combination of devices and frame, for example, without departing from the scope and spirit of the present invention. In addition, the contacts, such as an enclosure contact 426 and cooperating device contact 424, are linked electrically; however, they are not required to touch as could be created by an inductive linking system or an optical coupling system for signals for example. Finally, although the preferred embodiments described herein are directed to random access memory devices, such as a disc drive 102, and related technology, it will be appreciated by those skilled in the art that the teachings of the present invention can be applied to other systems, without departing from the spirit and scope of the present invention.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. A combination storage extracting and biasing system comprising:
    an enclosure having a first surface and a second surface inside the enclosure;
    at least one random access memory device substantially encased inside the enclosure, said at least one random access memory device having a third surface and a fourth surface;
    the device having at least one device contact located at the third surface and adapted to be electrically linked with at least one corresponding enclosure contact located at the first surface;
    a handle including at least one spring member attached to the device and interposed between the second surface and the fourth surface to provide pressure on the contacts and whereby manipulation of the handle facilitates removal of the device from the enclosure when the device is accessible.

2. The system of claim 1 wherein the second surface is opposite the first surface and the third surface is opposite the fourth surface.

3. The system of claim 1 further comprising:
    a fifth surface in the enclosure;
    a sixth surface on the device;
    a second spring member interposed between the fifth surface and the sixth surface.

4. The system of claim 3 further comprising:
    a seventh enclosure surface in the enclosure;
    an eighth surface on the device;
    the eighth surface adapted to be electrically linked with the seventh surface through second contacts located at the eighth surface and the seventh surface wherein the second spring member is adapted to provide pressure on the second contacts.

5. The system of claim 1 wherein the device is adapted to be electrically linked with the enclosure through additional contacts located on the fourth surface and the second surface and wherein a second spring member is interposed between the third surface and the first surface, the spring member adapted to provide pressure on the additional contacts.

6. The system of claim 1 wherein the second surface is a door that forms the enclosure when shut and reveals a receiving space when opened, the at least one random access memory device is passable into and out from the receiving space when the door is opened.

7. The system of claim 1 wherein the enclosure is a disc drive magazine enclosure and the at least one random access memory device is a disc drive.

8. The system of claim 1 wherein the spring member is a nylon tab having at least one bend and a free end adapted to engage the second enclosure surface.

9. The system of claim 1 wherein the spring member is from the group of materials consisting of: foam, metal, polymer, natural material.

10. The system of claim 1 wherein the spring member is a composite material.

11. The system of claim 1 wherein the spring member substantially stabilizes the device from freely moving when the device is disposed in the enclosure.

12. The system of claim 1 wherein the second surface is a surface of a second of the random access memory devices substantially encased by the enclosure.

13. The system of claim 1 wherein the second surface is a second spring member substantially inside of the enclosure.

14. A method for using a combination storage bias and extraction system comprising:
    inserting a random access memory device in a receiving space through an opening in an enclosure adapted to receive the random access memory device;
    covering the receiving space with a cover that cooperates with the opening to encase the random access memory device in the enclosure;
    linking the device electrically with at least one enclosure contact cooperating with the enclosure through at least one corresponding device contact cooperating with the device;
    applying pressure between the device contact and the corresponding enclosure contact from force generated by at least one spring member interposed between at least one random access memory device surface and at least one enclosure surface;
    uncovering the receiving space; and
    removing the device from the enclosure by the spring member.

15. The method of claim 14 wherein the applying pressure step is accomplished by interposing the spring member between the device and the enclosure.

16. The method of claim 14 wherein the applying pressure step is accomplished by interposing the spring member between the device and the cover.

17. The method of claim 14 wherein the applying pressure step is accomplished by interposing the spring member between the device and a second device substantially in the enclosure.

18. A combination storage extracting and biasing system comprising:

an enclosure comprising at least one enclosure contact element;

at least one random access memory device disposed substantially in the enclosure through an opening in the enclosure, the random access memory device comprising at least one device contact element and at least one spring and handle member;

the random access memory device electrically linked with the at least one enclosure contact element via the at least one device contact element in a corresponding relationship;

the at least one spring and handle member adapted to generate pressure on the contact element and the corresponding contact element when the device is disposed substantially in the enclosure wherein the enclosure comprises a cover, the cover is adapted to compress the spring and handle member to generate the pressure when the cover is covering the opening; and the at least one spring and handle member capable of being used to remove the device from the enclosure.

19. The system of claim 18 wherein the enclosure and the at least one device substantially comprises a device magazine.

* * * * *